United States Patent [19]

Sturmer et al.

[11] Patent Number: 4,945,452
[45] Date of Patent: Jul. 31, 1990

[54] TANTALUM CAPACITOR AND METHOD OF MAKING SAME

[75] Inventors: John Sturmer, N. Berwick; John Y. Cadwallader, Saco, both of Me.

[73] Assignee: AVX Corporation, New York, N.Y.

[21] Appl. No.: 443,386

[22] Filed: Nov. 30, 1989

[51] Int. Cl.⁵ .............................................. H01G 9/00
[52] U.S. Cl. .................................... 361/529; 29/25.03
[58] Field of Search ................ 29/570.1; 361/528, 529

[56] References Cited

U.S. PATENT DOCUMENTS 4,520,430  5/1985  Long et al. .......................... 361/529
4,791,532  12/1988  Gouvernelle et al. ............... 361/529

Primary Examiner—Donald A. Griffin
Attorney, Agent, or Firm—Arthur B. Colvin

[57] ABSTRACT

A method of manufacturing a tantalum capacitor includes compacting tantalum powder about a tantalum anode rod in such manner than the tantalum powder in a region in registry with the tantalum rod is compacted to a density of from about 8 to 10 grams per cc or more, whereas the density of the remaining portions of the tantalum powder mass are compacted to a density of from about 4 to 7 grams per cc. The disclosure further relates to a improved capacitor formed in accordance with the method, as well as to an improved capacitor preform, the capacitor and preform being characterized in that a higher reliability mechanical and electrical connection is effected between the anode rod and the tantalum materials surrounding the rod.

5 Claims, 1 Drawing Sheet

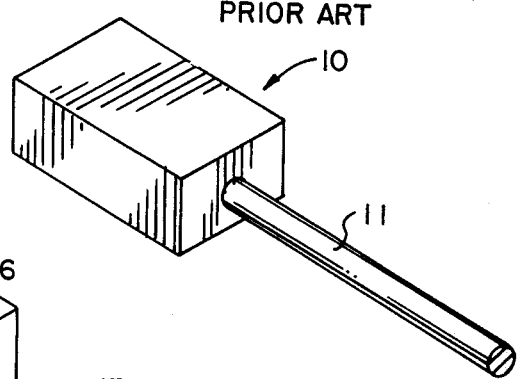
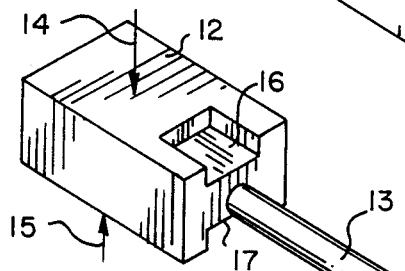
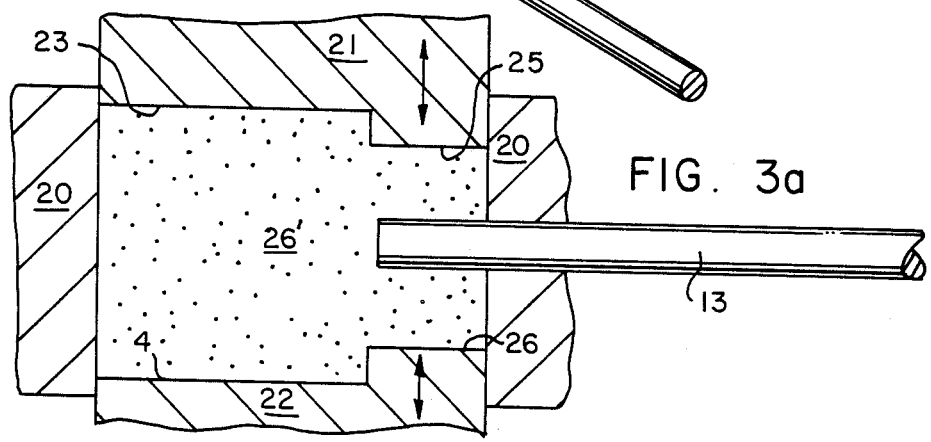
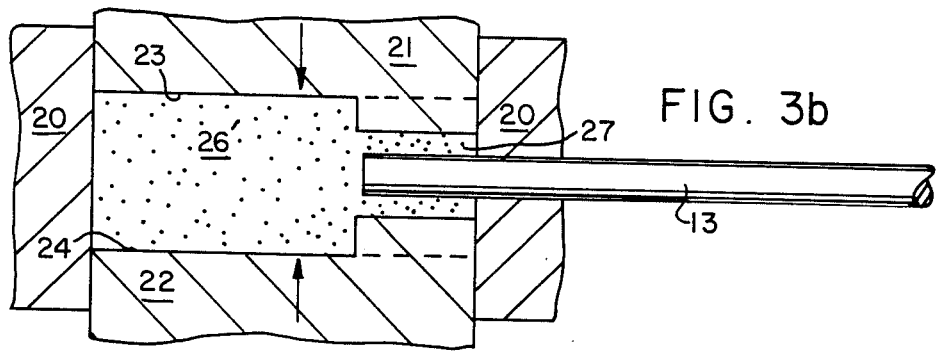

TANTALUM CAPACITOR AND METHOD OF MAKING SAME

BACKGROUND AND FIELD OF THE INVENTION

The present invention is in the field of tantalum capacitors and pertains more particularly to the method of fabricating tantalum capacitors to assure high reliability and to the resultant prefabricated tantalum pellet and resultant capacitor.

Prior Art

Tantalum capacitors are valued due to the ability to provide high capacitance in a small volumetric space. It is, for example, possible to provide a tantalum capacitor having fifty to one hundred MFD of capacitance at a working voltage of 10 volts with a capacitor body of 0.027 cc.

Common to most methods known in manufacturing solid tantalum capacitors, there are involved the steps of compressing the tantalum powder to provide a pellet of desired density, sintering the pellet, forming by anodization a dielectric film of tantalum pentoxide throughout the sponge-like mass resulting from the sintering process, forming a cathode by impregnating the mass with a solution of manganous nitrate and subsequent pyrolytic decomposition followed by successive applications of graphite and silver coating to form a termination to the cathode of the capacitor.

In conventional practice, the tantalum pellet is formed in one of several ways. In one known procedure, a sintered pellet has a tantalum rod welded to it. The region to which the rod is welded may be a highly compressed increment of the pellet. The rod provides an electrical connection to the anode of the capacitor as well as providing a means for handling the pellet during the subsequent anodizing and cathode forming steps. The weld method described, is disadvantageous in that the formation of the weld represents an expensive procedure (including the requirement for two separate sinters, before and after the welding operation), and unless critically carried out results in many failures at the weld interface both during subsequent processing steps and in use following fabrication of the capacitor.

In another conventionally practiced method of forming a pellet for a tantalum capacitor, a tantalum rod is inserted into the pellet forming die and a portion of the rod surrounded by the tantalum powder. The tantalum powder is subjected to compressive forces applied either in a direction parallel to the axis of the rod or perpendicular thereto resulting in the formation of a generally homogeneously compressed pellet surrounding a portion of the rod. The pellet and rod are thereafter subjected to a sintering step, anodized, a cathode layer is formed and terminated as described above.

While the latter method eliminates the welding step with its attendant disadvantages, we have discovered occasional failures of both a mechanical and electrical nature between the tantalum anode rod and remainder of the capacitor. We have discovered, through destructive testing of failed tantalum capacitors of the non-welded type, that such failures are in many instances attributable to the weak connection between the tantalum rod and the surrounding mass of tantalum powder. In particular, such weak connections are likely to result in the situation where the surrounding mass of tantalum powder has been pressed to a relatively low density and/or the sintering has been performed at a relatively low combination of time and temperature, and is further exacerbated by the tendency of the tantalum powders to shrink away from the rod during the sintering process with resultant loss of mechanical integrity and electrical integrity in the bond between the rod and the sintered tantalum mass. While the potential for failures of such nature has always been present, it has become especially prevalent with the advent of tantalum powders of 10,000 CV/GM or higher which, due to their nature, must be processed at conditions tending toward the aforementioned low density and/or low temperature.

SUMMARY OF THE INVENTION

The present invention may be summarized as directed to an improved non-welding method of manufacturing capacitors of the tantalum type which result in the production of a highly reliable mechanical and electrical connection between the tantalum rod anode and the capacitor body. In accordance with the invention, there is provided a preform which may be readily treated by way of anodization and cathode formation etc. with reduced fear of mechanical or electrical separation of the tantalum rod and surrounding mass of powder. The resultant capacitor exhibits a high degree of reliability in use, i.e. reduced tendency of the anode to lose mechanical and electrical connection to the remainder of the capacitor or to suffer damage to the associated dielectric film.

In accordance with the invention, the step of forming the tantalum pellet prior to sintering is carried out in a die wherein the body of tantalum powder is subjected to differential pressures, the pressures applied in forming the main body of tantalum powder being optimal for the creation of a high efficiency capacitor, the pressures applied to those areas of the powder in registry with the tantalum rod being substantially greater than those applied to the main body of tantalum powder. More specifically, solid tantalum metal has a density of approximately 16.6 grams per cc. It is generally recognized that to form a viable tantalum capacitor, tantalum powder of the aforementioned 10,000 CV/GM or higher type should be compressed to a density of approximately from about 4 to about 7 grams per cc. In accordance with the invention, the main body of the tantalum powder is compressed by the die structure to the desired density of from about 4 to 7 grams per cc, whereas that area of the powder which is in registry with the embedded portion of the tantalum anode rod is subjected to substantially greater pressures compacting the same to a density of about 8 to 10 grams per cc. The highly compressed area, for efficiency of operation of the capacitor, should, as a practical matter be limited to about no more than 10% and preferably about 6% of the total mass of the powder.

The result of the practice of the invention, is the provision of a tantalum preform wherein the major mass of the powder is compressed to the preferred density for 10,000 CV/G or greater tantalum powders from about 4 to 7 grams per cc, and that portion of the powder in registry with the embedded portions of the rod and leading to the exit point of the rod from the boundary of the pellet is subjected to the greater compressive forces densifying the same to about 9 grams per cc. It should be noted, that if the entire mass of a 10,000 CV/GM or greater tantalum powder were densified to the 9 gram per cc range, the resultant mass, if it could be treated at all by the anodizing and following processes, would exhibit an unacceptably low capacitance so as to render the same commercially useless. By forming the tantalum pellet preform with differential compression as described, there is provided, following sintering, an intermediate product which can be reliably treated for anodizing and cathode formation with reduced fear of disassociation of the anode rod from the remainder or damage to the dielectric film when subjected to the stresses of processing, including handling and thermal stresses. In this connection, the tendency of the tantalum material to shrink away from the anode during sintering is greatly reduced if not totally eliminated by the described differential densifying.

In accordance with the foregoing, it is an object of the invention to provide an improved method of fabricating a tantalum capacitor and tantalum capacitor preform, as well as the provision of a finished tantalum capacitor, more resistant to physical and thermal stresses.

BRIEF DESCRIPTION OF THE DRAWINGS

FIG. 1 is a schematic perspective view of a tantalum pellet preform formed in accordance with prior art methods.

FIG. 2 is a view similar to FIG. 1 showing a tantalum pellet preform in accordance with the invention.

FIG. 3a and 3b are schematic views of a forming die device for fabricating the green preform respectively in the loaded and compressed conditions.

DETAILED DESCRIPTION OF THE DRAWINGS

There is shown in FIG. 1 in schematic fashion a conventional tantalum pellet 10 formed of compacted tantalum powder having an embedded tantalum anode rod 11 projecting therefrom. The pellet 10 is formed by simply filling the die of predetermined volume with tantalum powder mixed with known binders and lubricants such as stearic acid, glyptal, oleic acid, tantalum sulfide, carbowax, accrowax, etc. The percentage of binders and lubricants may vary from between 0% to 4% and greater and typically 0.25% by weight of the total mass and functions to facilitate the compaction of the tantalum pellet and improve the green strength thereof, also reducing wear on the tooling. In the formation of the prior art pellet of FIG. 1, the pellet forming compacting forces are exerted either in a direction parallel to the axis of the tantalum rod, or perpendicularly with respect thereto. In the latter case, the density of the powder of the preform varies somewhat throughout the thickness of the pellet, being greater adjacent the boundaries of the pellet from which the compacting forces are exerted (normally the broad faces of the pellet) and least in a plane centrally of the pellet and perpendicular to the direction of application of compressive forces.

In accordance with the pellet of the invention as depicted in FIG. 2, the same comprises a body 12 and a projecting anode rod 13. A characterizing feature of the pellet, which is a function of the die configuration, results from the provision of the punches having in addition to the body forming components thereof an opposed pair of embossing components which project further toward the rod 13 in the direction of application of compressive forces (see arrows 14,15). As will be apparent from an inspection of FIG. 2, the die for forming the pellet 12 is essentially identical to that used in the formation of pellet 10 except in that the punches include a pair of upwardly and downwardly projecting lands which extend beyond the portion of the punches forming the upper and lower faces of the pellet to provide upper and lower indentations 16,17 in the areas in registry with the portions of rod 13 extending into the body of the pellet. As previously noted, and as will be more fully detailed in connection with a description of the actual pellet forming process, the major body portion of the pellet 12 is coordinated with the volume of tantalum powder such that the main body of the powder is compressed to the desired density of from about 4 to 7 grams per cubic centimeter (optimal 4.5 to 6) while the portions of the pellet body between indentations 16 and 17 are compressed to the higher density of about 9 grams per cc. We have discovered that the formation of a pellet as shown and described in respect of FIG. 2 may be sintered without significant shrinkage of the portions of the powder surrounding the embedded increment of the tantalum rod thereby assuring the mechanical contact between these portions and the rod during subsequent processing, and assuring good electrical and mechanical contact and stability between the tantalum rod and the processed capacitor. In addition to the importance of good electrical contact between the rod and tantalum component of a finished capacitor, the existence of such characteristics during subsequent processing is also highly important since the various processing steps involve handling and electrical processing of the sintered preform using the tantalum rod. Thus, if good electrical and mechanical contact between the rod and the tantalum mass is not present during the anodizing and subsequent steps, these step will not be properly completed with resultant variable effects on the characteristics of the finished capacitor.

DETAILED EXAMPLE OF PROCESS

Pursuant to the requirements of the patent laws, there is set forth herebelow a detailed description of the fabrication of a representative tantalum capacitor employing the method of the present invention. It should be appreciated that the described method should be taken in a non-limitative sense, and that numerous variations in formulation, times, temperatures etc. will readily suggest themselves to workers skilled in the arts of fabrication of tantalum capacitors.

A tantalum capacitor having a capacitance of 47MFD at 10 working volts is fabricated as follows. As a starting material there is provided a batch of 15,000 CV/GM tantalum powder thoroughly mixed with a binder and lubricant, by way of example stearic acid, 0.25 percent by weight. A volume of this starting material is placed in a die as schematically shown in FIGS. 3a and 3b in transverse section. The die 20 includes upper and lower punches 21,22 respectively, the inner opposed surfaces of which are configured so as to produce the upper and lower surfaces of the pellet 12. It will be appreciated that while a single die cavity is schematically shown in FIGS. 3a and 3b, in practice there may be provided a series of dies having a multiplicity of cavities.

The punches 21,22 include opposed surfaces 23,24 for defining the upper and lower faces of the pellet and include inwardly projecting lands 25,26 which will form the opposed high compression areas 16,17 of the pellet. A measured volume of the tantalum powder composition is loaded into the die and tantalum rod 13 inserted into the die in registry with the lands 25,26. As will be appreciated, the quantity of material loaded will govern the final compression to which the material is subjected, such quantity being variable in accordance with the initial spacing of the punches 21,22. In normal practice, the quantity of tantalum powder is calculated to provide, following closing of the punches, a density optimally of from about 4.5 to 6 grams per cubic centimeter, in the major area of the mold. After filling, the mold is closed from the position of FIG. 3a to the position of FIG. 3b, whereby the powder in the major volumetric region 26 of the mold is compressed to the desired degree (about 4 to 7 g/cc) and the powder in the region 27 in registry with the tantalum rod 13 is compressed to a density of a preferred range of 8 to 10 grams per cc. While a 3 element die cavity is illustrated, it will be readily recognized that the desired effects may be achieved using separate moving parts for forming the body and the high density areas.

In accordance with the specific example, the pellet is formed with the following final dimensions: 0.190 inches in the lengthwise direction (direction of wire insertion); 0.114 inches wide; 0.068 inches thick. The embossed areas 16,17 is 0.048 inches in its lengthwise and widthwise direction and has a thickness of 0.015 inches deep. The tantalum rod 13 has a diameter of 0.012 inches.

Using the dimensional characteristics set forth above, the volume of the high density region surrounding the tantalum rod amounts to only about 5.9 percent of the total volume of the pellet.

The resultant green pellet presents a coherent mass readily handled by handling of the tantalum rod.

The pellets are sintered in a vacuum environment (approximately $1 \times 10^{-5}$ TORR) at a temperature of 1600 degrees C. for approximately 20 minutes. The sintering removes the additive materials and results in converting the tantalum powder to a sponge-like coherent mass firmly, mechanically and electrically connected to the tantalum rod. An inspection of the resultant capacitor preforms shows that there is virtually no shrinkage of the material surrounding the rod away from the rod.

The capacitor preforms are thereafter processed in a manner conventional in the tantalum capacitor industry and briefly described below. The pellets are fixtured by their rods on metal strips and a dielectric tantalum pentoxide film is formed throughout the sponge-like mass by immersing the preforms in a nitric acid solution at 25 degrees C., the solution having, by way of example, a resistivity of 145 OHM-centimeter. The rods are connected to the positive terminal of an electrical source, the voltage being progressively raised to 60 volts. By way of example, the voltage may be progressively raised for one-half hour to the 60 volt value noted and maintained for approximately one hour at such voltage. As is well known in the industry, the applied voltage affects the working voltage of the finished capacitor, the higher the applied voltage, the higher the working voltage of the capacitor. Capacitors formed at a lower applied voltage will exhibit a lower working voltage but a higher capacitance.

The anodized capacitors are thereafter subjected to a step for forming cathodes by impregnation with and subsequent pyrolytic decomposition of Manganous nitrate, $Mn(NO_3)_2$, this step being provided by immersing the same in a solution of the reagent for a period of 5 sec. to 3 min., the solution being maintained at a temperature of substantially 25 to 65 degrees C. Pyrolytic decomposition is effected by placing the anodes in an oven at between 200 to 400 degrees C. (preferably 300 degrees C.) in a dry air or steam atmosphere. The capacitors thus formed are terminated by immersing the same in a colloidal suspension of graphite, illustratively a 2 percent graphite suspension sold under the tradename AQUADAG-E by the Acheson Colloids Corporation of Port Huron, Mich. The capacitors are dried at 150 degrees C. for a half hour and dipped in silver filled paint, an illustrative example whereof is Amicon-C-110 sold by Emerson & Cuming Inc. of Canton, Mass. The paint comprises essentially silver flake suspended in epoxy resin and solvent.

The resultant capacitor may have a cathode lead applied thereto as by soldering or alternatively a conductor may be engaged against the silver surface and maintained in position by heat shrinking an insulative plastic sleeve over the body of the capacitor. Numerous alternate means for applying cathode leads are well known in the industry.

An anode lead of matching conductive material may be attached by first cutting the tantalum rod to within a short distance of the body of the capacitor (e.g. 0.050) and then welding the anode lead to the remaining tantalum rod by capacitive discharge or other similar means. It is during these cutting and welding steps that the junction between the tantalum rod and capacitor body is often placed under greatest mechanical and/or thermal stress.

The finished capacitor may be encapsulated by dipping or other means known in the industry. The capacitor formed in accordance with the above described procedures exhibits a capacitance of approximately 47 Mfd. at 10 working volts.

Numerous factors affect the performance characteristics of tantalum capacitors, including particularly the nature of the starting tantalum powder material, as well as the various processing parameters. Since the pellet of the instant invention may be subjected to conventional processing steps, and will respond to such steps in the same manner as the prior art pellet exhibited in FIG. 1 hereof, a further description of processing details is not necessary, since the same are within the skill of those engaged in the fabrication of tantalum capacitors.

As will be apparent from the above description, by virtue of the compression of the tantalum pellet preform at a first rate in the main body of the pellet, and at a second and higher rate in the regions of the powder in registry with the tantalum anode rod, there is provided a capacitor preform which is less susceptible to damage in the course of processing, finishing, or subsequent use.

Numerous variations in details of the method steps and construction will occur to those skilled in the art and familiarized with the instant disclosure. Accordingly, the same should be broadly construed within the scope of the appended claims.

We claim:

1. A method of manufacturing an improved tantalum capacitor of the non-welded type which comprises the step of providing a pulvurent mass of tantalum powder, inserting a tantalum rod part-way into said mass, fabricating a capacitor preform by subjecting said mass to differential compressive forces, the regions of said mass in registry with portions of said rod being subjected to forces applied perpendicularly to the longitudinal axis of said rod and thereby compacted to a high density of from about 8 to 10 grams per cc or more, the regions of said mass surrounding said registering regions being subjected to compressive forces to compact the same to a lower density of from about 4 to 7 grams per cc, thereafter sintering said preform in an inert environment, anodizing said sintered mass, and forming a cathode in said anodized mass by impregnation.

2. The method of claim 1 wherein the volume of said high density portions of said mass comprise less than about 10 percent of the totality of said mass.

3. In a tantalum capacitor comprising a tantalum anode rod, a sintered porous mass of tantalum particles surrounding said anode rod, portions of said mass engaging said rod being non-welding mechanically and electrically coupled to said rod, a dielectric film encompassing the surface area of portions of said mass and a conductive cathode impregnant encompassing said dielectric coating film, the improvement which comprises the density of said mass in substantially the entirety of the regions of said mass in registry with said anode rod being from about 8 to 10 or more grams per cc, the density of the remaining regions of said mass being from about 4 to 7 grams per cc.

4. A preform for the fabrication of an improved tantalum capacitor of the non-welded type comprising a coherent pulvurent mass of tantalum particles, a tantalum rod having an end embedded in said mass and a projecting end, characterized in that the regions of said mass immediately surrounding an extended longitudinal portion of said rod are compressed to a density of from about 8 to 10 grams per cc or more, the regions of said mass remote from said surrounding regions being compressed to a density of from about 4 to 7 grams per cc.

5. A preform in accordance with claim 4 wherein said regions surrounding said rod extend to boundary of said mass.

* * * * *